US005256358A

United States Patent [19]

Shiraki et al.

[11] Patent Number: 5,256,358

[45] Date of Patent: Oct. 26, 1993

[54] METHOD OF MAKING STRETCHED FILAMENTS OF ULTRA-HIGH-MOLECULAR WEIGHT POLYETHYLENE

[75] Inventors: Takeshi Shiraki, Yamaguchi; Yoshihiro Yoshimura, Iwakuni; Koji Nakashima, Hiroshima, all of Japan

[73] Assignee: Mitsui Petrochemical Industries, Ltd., Tokyo, Japan

[21] Appl. No.: 911,360

[22] Filed: Jul. 9, 1992

Related U.S. Application Data

[60] Continuation of Ser. No. 663,771, Mar. 4, 1991, abandoned, which is a continuation of Ser. No. 561,484, Aug. 2, 1990, abandoned, which is a continuation of Ser. No. 117,414, Nov. 2, 1987, abandoned, which is a division of Ser. No. 822,517, Jan. 27, 1986, abandoned.

[30] Foreign Application Priority Data

Jan. 29, 1985 [JP] Japan .................................... 60-13624
May 31, 1985 [JP] Japan .................................... 60-118213

[51] Int. Cl.[5] ............................ D01F 6/04; D02J 1/22

[52] U.S. Cl. .............................. 264/210.7; 264/210.8; 264/211.22

[58] Field of Search ............. 264/210.8, 211.22, 210.7

[56] References Cited

U.S. PATENT DOCUMENTS 3,382,535 5/1968 Ferrari .
4,276,348 6/1981 Wu et al. ............................ 428/373
4,422,993 12/1983 Smith et al. ...................... 264/210.8
4,430,383 2/1984 Smith et al. ........................ 428/364
4,504,432 3/1985 Kamei et al. .
4,551,296 11/1985 Kavesh et al. .
4,713,205 12/1987 Su ...................................... 264/176.1

FOREIGN PATENT DOCUMENTS 115192 8/1984 European Pat. Off. .
3417543 11/1984 Fed. Rep. of Germany .
37-9765 7/1962 Japan .

*Primary Examiner*—Leo B. Tentoni
*Attorney, Agent, or Firm*—Armstrong, Westerman, Hattori, McLeland & Naughton

[57] ABSTRACT

An extruded stretched filament of ultra-high-molecular-weight polyethylene has an intrinsic viscosity [$\eta$] of at least 3.5 dl/g, a tensile strength at break of 10 kg/mm$^2$, a draw ratio of at least 3, a C axis orientation degree of at least 0.9, an outer diameter of 0.1 to 10 mm$\phi$, and a substantially indefinite length, and a method and apparatus for producing the same.

3 Claims, 2 Drawing Sheets

10
9
8
7
5
6
4
3
1
12
2
11

METHOD OF MAKING STRETCHED FILAMENTS OF ULTRA-HIGH-MOLECULAR WEIGHT POLYETHYLENE

This application is a continuation of application Ser. No. 663,771 filed Mar. 4, 1991, abandoned which is a continuation of Ser. No. 561,484 filed on Aug. 2, 1990, abandoned which is a continuation of Ser. No. 117,414 filed on Nov. 2, 1987, abandoned which is a division of Ser. No. 822,517 filed on Jan. 27, 1986, abandoned.

BACKGROUND OF THE INVENTION

1. Field of the Invention

The present invention relates to an extruded stretched filament of ultra-high-molecular-weight polyethylene and to a method and apparatus for producing the same. The present invention also relates to a whitened wire of ultra-high-molecular-weight polyethylene capable of being plastically deformed into any desired shape and a method for producing the same.

2. Description of the Related Art

Ultra-high-molecular-weight polyethylene is increasingly used as a so-called engineering plastic because of its excellent impact resistance, abrasion resistance, chemical resistance, tensile strength, and other properties, when compared with conventional polyethylene. However, ultra-high-molecular-weight polyethylene has an extremely high melt viscosity and poor flowability when compared with conventional polyethylene, and thus it is very difficult to mold such a plastic by conventional extrusion molding and injection molding. Accordingly, ultra-high-molecular-weight polyethylene is generally molded by compression molding; with the exception of rods and the like, which are partly extrusion molded at a very low extrusion speed.

On the other hand, as a method for stretching the monofilament of high-density polyethylene at a high draw ratio, it has been proposed in, for example, Japanese Examined Patent Publication (Kokoku) No. 37-9765, that an additive (e.g., o-chlorobenzene, xylene) having a boiling point higher than the melting point of the polyethylene is incorporated into the polyethylene in an amount of 20% to 150% by weight based on the weight of the polyethylene and the resultant dispersion is formed into a primary fibrous material, followed by hot stretching at a draw ratio of 3 to 15 while retaining the 5% to 25% by weight corresponding amount of the additive in the spun threads. It has been also proposed in, for example, Japanese Unexamined Patent Publication No. 56-15408, that a solution of linear polyethylene having a molecular weight of 400,000 or more is spun, followed by stretching the same at a temperature such that the modulus of at least 20 GPa can be obtained. However, although these methods can provide stretched filaments having a high elasticity and high strength, raw filaments having a diameter of more than 1 mmϕ are very difficult to obtain since a solution having an extremely low viscosity obtained by diluting ultra-high-molecular-weight polyethylene or the like with a large amount of a solvent is extruded and processed. Thus, the stretched thread generally has a thickness of 10 deniers or less (i.e., diameter: 0.038 mmϕ or less) and a thickness of at most about 50 deniers. Accordingly, since a large amount of these stretched fine threads must be interwined to form thick ropes and nets having a high strength, or cords for cord cutters (i.e., lawn mowers), there are problems in that the process operations are troublesome, the stiffness of the resultant ropes and nets is unpreferably high, and the flexibility is insufficient. Furthermore, the resultant ropes and nets are usually very hairy.

In addition, it has been proposed in, for example, Japanese Unexamined Patent Publication (Kokai) No. 52-74682, that polymers having a weight-average molecular weight of 150,000 or more are processed under the conditions of a temperature of about 75° C. to about 140° C. and a deformation ratio of about 18 or more to form elongated and orientated polymers. However, this reference describes that the diameter of fibers or the thickness of films or tapes before stretching is preferably about 1 mm or less. Also, the Examples given therein only disclose that polyethylene having a molecular weight of about 300,000 is spun through circular orifices having a diameter of 1 mm to form thin filaments having a diameter of 0.7 mm or less and, in the case of polyethylene having a molecular weight of 800,000, filaments are prepared only by stretching dumbbell-shaped samples having a gauge dimension of 1 cm ×0.2 cm derived from the compressed sheet having a thiickness of 0.5 mm. Thus, it has not been established in the art that filaments having a diameter of more than 1 mmϕ can be industrially produced from ultra-high-molecular-weight polyethylene having an extremely high molecular weight.

Furthermore, it has been desired in the art to substitute plastic wires for the iron wires usually used in, for example, orchards, e.g., for tying the loculi of fruit and for grape-vine trellises, because iron wires easily rust and cannot withstand the effects of long-term use. However, conventionally commercialized plastic wires composed of nylon and polypropylene have a certain elasticity and, therefore, cannot be plastically deformed, unlike iron wires: For example, plastic wires cannot be firmly joined only by twisting.

SUMMARY OF THE INVENTION

Accordingly, the objects of the present invention are to eliminate the above-mentioned disadvantages of the prior art and to provide a continuous production of an extruded stretched filament of ultra-high-molecular-weight polyethylene having an outer diameter of more than 1 mmϕ.

Another object of the present invention is to provide an apparatus capable of producing an extruded stretched filament of ultra-high-molecular-weight polyethylene having an outer diameter of more than 1 mmϕ.

A further object of the present invention is to provide a whitened wire of ultra-high-molecular-weight polyethylene capable of being plastically deformed.

Other objects and advantages of the present invention will be apparent from the following description.

In accordance with the present invention, there is provided an extruded stretched filament of ultra-high-molecular-weight polyethylene having an intrinsic viscosity [$\eta$] of at least 3.5 dl/g, a tensile strength at break of at least 10 kg/mm$^2$, a draw ratio of at 10 least 3, a C axis orientation degree of at least 0.9, an outer diameter of 0.1 to 10 mmϕ, and a substantially indefinite length.

In accordance with the present invention, there is also provided a method for producing an extruded stretched filament of ultra-high-molecular-weight polyethylene comprising the steps of:

melting the ultra-high-molecular-weight polyethylene in a screw extruder;

extruding the molten ultra-high-molecular-weight polyethylene from a die having an L/D of at least 10; and taking-off the extrudate at a draft ratio of at least 1 while the extruded strands are gradually cooled.

In accordance with the present invention, there is further provided an apparatus for producing an extruded stretched filament of ultra-high-molecular-weight polyethylene comprising, in sequence from an extruder side:

an extruder provided with a grooved cylinder and a screw having a compression ratio of 1 to 2.5;

a die connected to the screw tip, the die having an L/D of at least 10 and a ratio $S_1/S_2$ of a cross-sectional area $S_1$ of the inlet portion of the die to a cross-sectional area $S_2$ of the outlet portion of the die of 1.0 to 5.0;

a gradual-cooling cylinder provided with an air ring or a sizing die at the inlet portion thereof for the extruded strand; and a taking-off unit.

In accordance with the present invention, there is still further provided a whitened wire of ultra-high-molecular-weight polyethylene having an intrinsic viscosity [$\eta$] of at least 4 dl/g, a tensile strength at break of at least 20 kg/mm$^2$, and a folding return angle $\theta$ of 20° or less when folded at 90° and 180°. This whitened wire can be produced by comprising the steps of:

melting the ultra-high-molecular-weight polyethylene in a screw extruder;

extruding the molten ultra-high-molecular-weight polyethylene from a die having an L/D of at least 10;

taking-off the extrudate at a draft ratio of at least 1 while gradually cooling the extruded strands; and stretching the strands at a draw ratio of 8 to 30.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
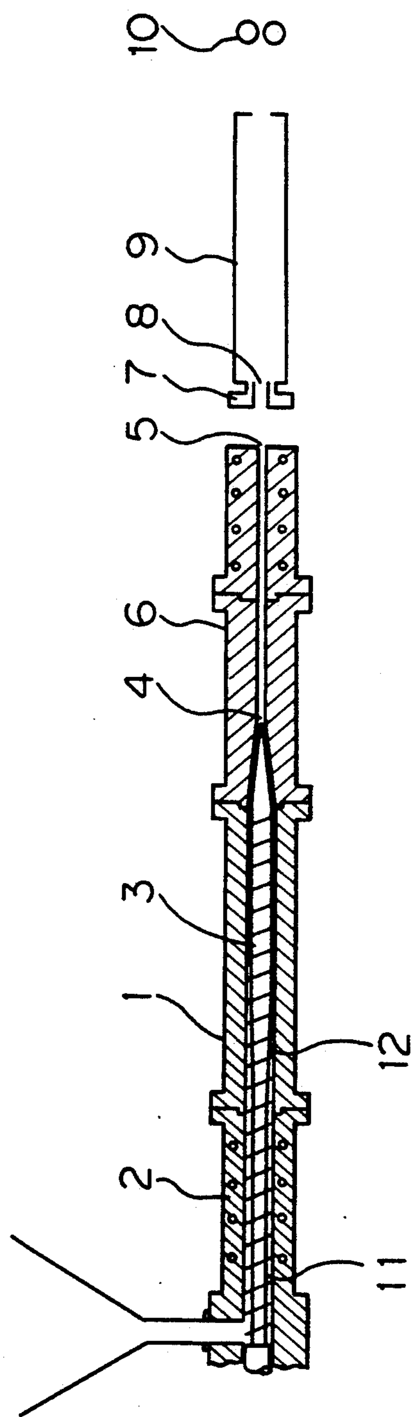
FIG. 1 schematically illustrates a cross-section of a typical embodiment of an apparatus for producing a stretched filament of ultra-high-molecular-weight polyethylene according to the present invention.

The ultra-high-molecular-weight polyethylenes usable in the present invention are crystalline ethylene homopolymer or crystalline ethylene-alpha-olefin copolymers having a major content of ethylene (e.g., an ethylene content of about 95 to about 100 mol%) having an intrinsic viscosity [$\eta$], determined at 135° C. in a decalin solvent, of 3.5 dl/g or more, preferably 4 dl/g or more, more preferably 8 to 25 dl/g, and a melt flow rate (MFR), determined according to an ASTM D-1238(F) method, of 0.01 g/10 min or less. Examples of the alpha-olefin comonomers are those having 3 to 20 carbon atoms such as propylene, 1-butene, 1-hexene, 1-octene, and 4-methyl-1-pentene.

According to the present invention, the stretched filaments of ultra-high-molecular-weight polyethylene can be obtained by stretching raw filaments thereof prepared as mentioned below. The resultant stretched filaments have an instrinsic viscosity [$\eta$] of at least 3.5 dl/g, preferably 4 dl/g or more, more preferably 6 to 20 dl/g, a tensile strength (TS) at break of at least 10 kg/mm$^2$, preferably 20 kg/mm$^2$ or more, more preferably 40 kg/mm$^2$ or more, a draw ratio of at least 3, preferably 6 or more, a C axis orientation degree of at least 0.9, preferably 0.95 or more, and an outer diameter of 0.1 to 10 mm$\phi$, preferably 0.2 to 3 mm$\phi$. The length of the stretched filaments according to the present invention is substantially indefinite.

When the intrinsic viscosity [$\eta$] is less than 3.5 dl/g, the average chain length of the molecules is short and, therefore, the tensile strength is disadvantageously small even in the case of the higher draw ratio. When the tensile strength at break is less than 10 kg/mm$^2$, sufficient strength cannot be obtained especially for use as ropes, nets or cords for a cord cutter. When the draw ratio is less than 3, the stretched filaments having a tensile strength of 10 kg/mm$^2$ or more are very difficult to obtain. When the C axis orientation degree is less than 0.9, not only are the stretched filaments having a tensile strength of 10 kg/mm$^2$ or more very difficult to obtain, but also the creep deformation (or elongation) of the product tends to become large.

When the outer diameter of the stretched filaments according to the present invention is less than 0.1 mm$\phi$, the productivity of the raw filament is low and is not practical, although the filament can be technically produced. Contrary to this, when the outer diameter is more than 10 mm$\phi$, the initial investment for the stretching device becomes unpreferably large and practical usage of the filament is poor.

According to the present invention, the raw filaments of the stretched filaments of the ultra-high-molecular-weight can be produced by melting the above-mentioned ultra-high-molecular-weight polyethylene in a screw extruder, preferably a screw extruder provided with a grooved cylinder (or barrel), and then melt-extruding the molten polyethylene from a die having an L/D of at least 10, preferably 15 or more, more preferably, 30 to 60. After the extruding, the extrudate is taken-off at a draft ratio of at least 1, preferably 1.2 to 30, while the extruded strands are gradually cooled, preferably by passing through a cooling cylinder having a length of, for example, 0.3 to 5 m, and air blowing at 15° C. to 80° C. Thus, the desired raw filaments of ultra-high-molecular-weight polyethylene having an outer diameter of generally 0.2 to 20 mm$\phi$, preferably 2 to 10 mm$\phi$, and having an excellent stretchability can be obtained. The terms "draft ratio" or "draw ratio" used herein denote a ratio of the take-off speed of the taking-off unit to the extruding speed of the extrudated polyethylene at the outlet of the die.

When a die having an L/D of less than 10 is used, the molten polyethylene has a poor melt flowability and is not completely uniformly fused before being extruded from the die, since the molten ultra-high-molecular-weight polyethylene is a rubber-like mass unlike the molten product of conventional polyethylene and, therefore, only raw filaments having a poor stretchability can be obtained. As a result, the stretched filaments having sufficient strength cannot be obtained even after stretching. On the other hand, although there is no critical limitation to the upper limit of the L/D ratio, the preferable upper limit of the L/D ratio is 100 from a practical viewpoint. The shape of the die is generally circular or cylindrical. There is a correlationship between the productivity and the L/D ratio of the die. Thus, the larger the L/D ratio, the bigger the increase in the production rate (i.e., the taking-off speed).

When the molten strands extruded from the die are quenched, for example, by means of a water-circulation water bath, raw filaments having poor stretchability are obtained because bubbles having a vacuum are generated in the cores of the strands and because the crystallinity becomes low. In addition, in order to obtain stretched filaments having an excellent tensile strength at break from the raw filaments obtained by the draft ratio of less than 1, the draw ratio must be at least 4 and thus loses efficiency.

According to the present invention, there are no critical limitations to the extrusion molding temperature of the ultra-high-molecular-weight polyethylene, as long as the temperature is higher than the welding point of the polyethylene but lower than the decomposition temperature thereof. The preferable extrusion temperature conditions of the above-mentioned ultra-high-molecular-weight polyethylene are an extruder temperature of 180° C. to 350° C., a temperature between the inlet and the intermediate portion of the tube die of 180° C. to 300° C., and temperatures between the intermediate portion and the outlet of the tube die of 135° C. to 160° C. Thus, according to the present invention, the desired raw filaments of the ultra-high-molecular-weight polyethylene having an outer diameter of 0.2 to 20 mm$\phi$, preferably 2 to 10 mm$\phi$, especially when the wires are produced therefrom, can be obtained.

When the extruded stretched filaments of the ultra-high-molecular-weight polyethylene having an outer diameter of 0.2 to 20 mm$\phi$ are produced, either dry stretching or wet stretching may be carried out. However, the use of wet stretching is preferable from the standpoint of heat transfer efficiency and temperature control accuracy. Furthermore, the use of multiple-step stretching is preferable, when compared to single step stretching, because the draw ratio can be increased and because stretched filaments having a high strength can be obtained.

A typical embodiment of the apparatus suitable for use in the production of extruded raw filaments from the above-mentioned ultra-high-molecular-weight polyethylene will be explained in detail with reference to the accompanying drawing.

As illustrated in FIG. 1, the apparatus for producing raw filaments from the ultra-high-molecular-weight polyethylene comprises, in sequence from the extruder side, an extruder 1 provided with a grooved cylinder 2 and a screw 3 having a compression ratio of 1 to 2.5, preferably 1.3 to 1,8; a cylindrical die 6 connected to the tip of the screw 3, a cooling cylinder 9, and a taking-off unit 10. The die 6 has an L/D ratio of at least 10, preferably 15 or more, more preferably 30 to 60, and a ratio $S_1/S_2$ of a cross-sectional $S_1$ of the inlet portion 4 of the die 6 to a cross-sectional area $S_2$ of the outlet portion 5 of the die 6 of 1 to 5, preferably 1.5 to 3.0. The cooling cylinder 9 for gradually cooling the extruded strands is provided with an air ring or sizing die (not shown) at the inlet portion 8 of the strands.

The grooved cylinder 2 is provided with groove portions 11 to ensure a stable feed of the powder particles of the ultra-high-molecular-weight polyethylene to a compression zone 12. As mentioned above, the compression ratio of the screw 3 should be within the range of 1 to 2.5. When the compression ratio of the screw 3 is less than 1.0, the contact stress of the polyethylene against the cylinder wall is small, so that the extrusion amount becomes unstable and the resultant extruded filaments will have a poor appearance due to surging or insufficient deaeration. Contrary to this, when the compression ratio of the screw 3 is more than 2.5, the polyethylene temperature is abnormally increased due to clogging and the generation of frictional heat in the compression zone, so that the friction coefficient and abrasion resistance of the extruded raw filaments are impaired due to a decrease in the molecular weight of the polyethylene caused by thermal decomposition.

The term "compression ratio" of the screw 3 used herein is defined by a ratio of the groove depth at the hopper portion of the screw 3 to the groove depth at the screw tip.

The L/D ratio of the extruder 1 according to the present invention is generally 7 to 32, preferably 20 to 26. When the L/D ratio of the extruder 1 is less than 7, powder of the ultra-high-molecular-weight polyethylene is likely to be fed to the cylindrical die 4 because of incomplete melting.

On the other hand, when the L/D ratio of the cylindrical die 6 is less than 10, raw filaments having a poor stretchability are formed because the molten product of the ultra-high-molecular-weight is not completely fused before the molten product is extruded from the die. The L/D ratio of the cylindrical die 6 is defined by a ratio of the length L between the inlet portion 4 of the cylindrical die 6 and the outlet portion 5 of the die 6 to the inner diameter D of the die outlet 5. Also, as mentioned above, the ratio $S_1/S_2$ should be within the range of 1 to 5. When the ratio $S_1/S_2$ is less than 1, the fusion of the molten ultra-high-molecular-weight polyethylene becomes incomplete due to an insufficient inner pressure and, therefore, the appearance (or shape) of the extruded strand is worsened and the desired raw filaments having an excellent stretchability cannot be obtained. Contrary to this, when the ratio $S_1/S_2$ is more than 5, a so-called shear failure stream is possibly generated in the molten product and, therefore, an unpreferable low speed extrusion must be carried out.

There are no critical limitations to the length of the gradual-cooling cylinder 9 as long as the length thereof is sufficient to cool the molten strands extruded from the cylindrical die without quenching. For example, the length of the cooling cylinder 9 is generally 0.3 to 5 m, preferably 1 to 3 m. When the length of the cooling cylinder 9 is less than 0.3 m, the molten strands cannot be properly gradually cooled when the taking-off speed is high. The air ring provided at the inlet portion of the cooling cylinder 9 for molten strands is designed to gradually cool the molten strands by supplying warm air having a temperature of from 15° C. to 80° C., preferably, 30° C. to 50° C. Furthermore, in the apparatus according to the present invention, a sizing die (not shown) is optionally provided at the inlet side of the cooling cylinder 9 to control the size of the molten strands and to gradually cool those strands.

According to the present invention, the extruded strands having an intrinsic viscosity $[\eta]$ of, for example, 4 dl/g, preferably 8 to 30 dl/g, and a tensile strength at break of 20 $kg/mm^2$ or more, preferably 50 $kg/mm^2$ or more, are stretched at a draw ratio of 8 to 30 to form whitened plastic wires. The resultant plastic wires of the ultra-high-molecular-weight polyethylene are oriented and crystallized in the stretching direction by stretching. As a result, the wires are divided into five fibers to form whitened wires, and accordingly, when the wires are bent or twisted, deformation is caused by slip between the fibers based on stress. Thus, even after the stress is removed, such deformation can not be recovered and the wires brought to their original linear shape, due to the elasticity thereof.

Figure 2A:
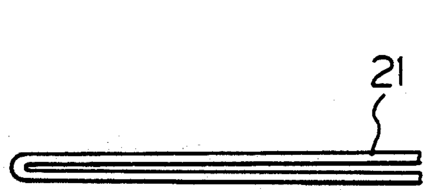
FIGS. 2(*a*) and (*b*) schematically illustrate the conditions of the plastic wire 21 according to the present invention when the plastic wire 21 is folded.
Figure 2B:
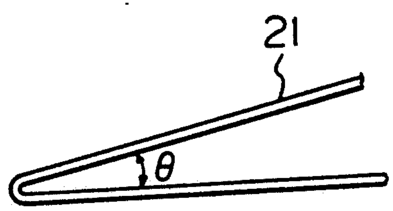
Figure 3A:
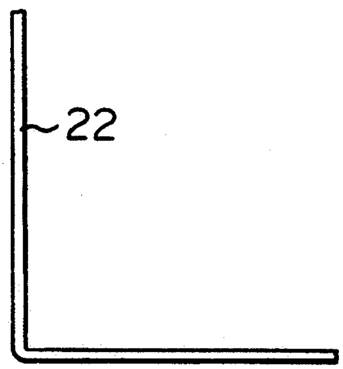
FIGS. 3(*a*) and (*b*) schematically illustrate the conditions of the plastic wire 22 according to the present invention.
Figure 3B:
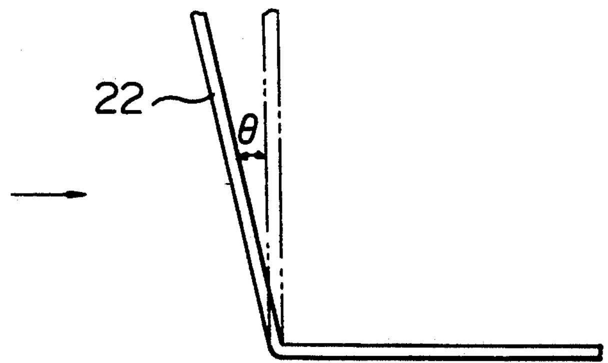

The folding return angles θ when the present wire is folded at 90° and 180° are 20° or less, preferably 10° or less. The term "folding return angle" used herein means the returning angle θ after the wires are allowed to stand for 10 minutes at the folding conditions as shown in FIGS. 2 and 3.

When the intrinsic viscosity [η] is less than 4 dl/g, the average molecular chain lengths are small and, therefore, the tensile strength cannot be increased even when the draw ratio is increased. On the other hand, when the tensile strength at break is less than 20 kg/mm$^2$ or less, the strength is likely to be insufficient for enabling the plastic wires to be used instead of iron wires.

The outer diameter of the plastic wires according to the present invention is generally about 0.4 to 3.5 mmφ, preferably about 0.5 to 2.5 mmφ. The plastic wires according to the present invention can be used either as a single wire or as thicker wires obtained by twisting a plurality of single wires. When the outer diameter is less than 0.4 mmφ, the productivity of the raw filaments is low from the industrial point of view. On the other hand, when the thickness of the wire is more than 3.5 mmφ, the initial cost for the stretching apparatus is unpreferably large and also no practical use thereof can be expected.

The stretching temperature is preferably a temperature of the melting point of the ultra-high-molecular-weight polyethylene plus 15° C. or less, preferably 80° C. to 150° C., more preferably 100° C. to 150° C. Although the stretching can be effected even at a temperature higher than the melting point of the ultra-high-molecular-weight polyethylene plus 15° C., the desired whitened wires having a high strength cannot always be obtained. Contrary to this, when the stretching temperature is too low, the desired high strength cannot always be obtained although the whitened wires can be obtained.

Although the stretching can be carried out at a single stage, a multi-stage stretching can be advantageously utilized because the draw ratio can be increased and because the desired stretched filaments having a high strength can be obtained.

The typical multi-stage stretching conditions are as follows. That is, the raw filaments or strands are stretched at a draw ratio of 4 to 8 at 80° C. to 135° C. in the first-stage, and the stretched filaments are then stretched at a draw ratio of 2 to 5 at 140° C. to 150° C. in the second-stage. Thus, the raw filaments are stretched at a total draw ratio of 8 to 30, preferably 10 to 30. The plastic wires thus obtained are oriented and crystallized in the stretching direction and are whitened.

As explained above, although the stretched filaments of the ultra-high-molecular-weight polyethylene according to the present invention have an outer diameter of 0.1 to 10 mmφ, which is very much thicker conventional melt-spun filaments or the like of ultra-high-molecular-weight, the stretched filaments according to the present invention have an extremely high tensile strength at break, when compared to conventional stretched filaments of ultra-high-molecular-weight polyethylene, while retaining the inherent characteristics of the ultra-high-molecular-weight polyethylene such as abrasion resistance, self-lubricating properties, and impact resistance. Accordingly, the present stretched filaments can be advantageously used as, for example, thick ropes and nets for ship mooring and load carriers or cords for cord cutters (i.e., lawn mowers), for which the use of conventional ultra-high-molecular-weight polyethylene filaments is limited.

Furthermore, the above-mentioned production process and apparatus according to the present invention, can stably produce raw filaments of the ultra-high-molecular-weight polyethylene having an excellent stretchability, which filaments are suitable for producing stretched filaments having the above-mentioned characteristics and which have been difficult to produce heretofore.

Furthermore, as mentioned above, since the plastic wires produced according to the present invention are plastically deformable, these plastic wires can be twisted for tying in the same way as iron wires. Accordingly, the plastic wires according to the present invention can be substituted for conventional iron wires in any usage where no substantial heat is applied. For example, the plastic wires according to the present invention can be used for tying the loculi of fruit and for constructing grape-vine trellises and orchard shelves. In addition, since the plastic wires according to the present invention do not rust, unlike iron wires, the present plastic wires have an excellent serviceability and can be repeatedly used, without snapping the wires, due to the plastic deformability thereof.

EXAMPLES

The present invention will now be further illustrated by, but is by no means limited to, the following Examples.

EXAMPLE 1 AND COMPARATIVE EXAMPLE 1

Stretchable raw filaments (or strands) of ultra-high-molecular-weight polyethylene were produced by using an apparatus for producing such stretchable raw filaments (or strands).

The specifications of the apparatus used are as follows.

Screw:
- Outer diameter = 20 mmφ
- Effective screw length (L/D) = 22
- Compression ratio = 1.8

Die:
- Length = 240 mm
- Inner diameter at die outlet = 6 mmφ
- Die L/D = 40
- $S_1/S_2 = 1.8$ Powdered ultra-high-molecular-weight polyethylene; Hizex ® Million 240M (available from Mitsui Petrochemical Industries, Ltd. having an intrinsic viscosity [η] of 16.5 dl/g, an MFR of less than 0.01 g/10 min, a melting point of 136° C., and a bulk density of 0.45 g/cm$^3$) was extruded from the above-specified extruder under the following conditions to produce stretchable raw filaments or strands of the ultra-high-molecular-weight polyethylene having an outer diameter of 4.0 mmφ.

Setting temperature
- Extruder = 320° C.
- Die base ($D_1$) = 200° C.
- Die tip ($D_2$) = 140° C.

Screw revolution number = 50 rpm

Taking-off speed = 1.5 m/min.

The resultant strands were stretched in a stretching bath containing triethylene glycol at a draw ratio of 18 (i.e., first stage: 6 times at 133° C., second stage: times at 144° C.) to produced the stretched filaments.

In Comparative Example 1, conventional polyethylene having an intrinsic viscosity [η] of 2.6 dl/g, an MFR of 0.11 g/10 min, a density of 0.956 g/cm³, and a melting point of 131° C. was extruded and stretched in the same manner as in Example 1, except that the extruder temperature was changed to 220° C. Thus, the stretched filaments were produced.

The physical properties of the resultant stretched filaments were determined according to the following methods.

The results were as shown in Table 1.

Density: ASTM D1505

Diameter:Micrometer

Tensile test: Tensile strength at break (kg/mm²), Young's modulus (kg/mm²), and elongation (%) were determined at 23° C. under the conditions of a stress rate of 200 mm/min and a chuck distance of 200 mm by using an Instron type universal testing machine CATY-1001ZS manufactured by the Yonekura Co., Ltd.

Degree of orientation: Degree of orientation was calculated from the following equation by determining the (110) face reflection by using X-ray diffraction apparatuses RU-200A and RU-200PL.

$$\text{Degree of orientation} = \frac{180 - \alpha^\circ}{180}$$

wherein α° is the half width of (110) face reflection

EXAMPLE 2 AND COMPARATIVE EXAMPLE 2

Stretchable strands of ultra-high-molecular-weight polyethylene having an outer diameter of 8.0 mmϕ were produced in the same manner as in Example 1, except that a die having a length of 600 mm, an inner diameter at die outlet of 12 mmϕ, an L/D ratio of 50, and an $S_1/S_2$ ratio of 1.9 was used, and that the screw revolution number and the taking-off speed were changed to 50 rpm and 0.8 m/min, respectively. The strands thus obtained were stretched at a draw ratio of 8 (i.e., first stage: 4 times at 134° C., second stage: 2 times at 145° C.).

In Comparative Example 2, stretched filaments were produced in the same manner as in Example 2, except that the conventional polyethylene used in Example 1 was used in lieu of the ultra-high-molecular-weight polyethylene.

The physical properties of the resultant stretched filaments were determined in the same manner as in Example 1. The results are as shown in Table 1.

COMPARATIVE EXAMPLE 3

An attempt was made to produce stretchable strands of the ultra-high-molecular weight polyethylene used in Example 1 in the same manner as in Example 1, except that a die having a length of 50 mm, an inner diameter, at die outlet, of 6 mmϕ, an L/D ratio of 8.3, and an $S_1/S_2$ ratio of 1.1 was used, the setting temperatures of the extruder, $D_1$, and D2 were changed to 350° C., 230° C., and 140° C., respectively and the screw revolution number and the taking-off speed were changed to 25 rpm and 0.7 m/min, respectively. However, the polyethylene was intermittently cut off and continuous stretchable strands could not be produced.

TABLE 1

| Properties | Unit | Example 1 Million 240M | Comparative Example 1 Conventional polyethylene | Example 2 Million 240M | Comparative Example 2 Conventional polyethylene |
|---|---|---|---|---|---|
| Intrinsic viscosity [η] | dl/g | 15.1 | 2.2 | 11.0 | 2.5 |
| Density | g/cm³ | 0.967 | *1 | 0.957 | 0.959 |
| Diameter of product | mmØ | 0.9 | *1 | 2.7 | 2.7 |
| Tensile strength at break | kg/mm² | 110 | *1 | 45 | 28 |
| Young's modulus | kg/mm² | 950 | *1 | 380 | 210 |
| Elongation | % | 6 | *1 | 15 | 23 |
| Degree of orientation | — | 0.97 | *1 | 0.96 | 0.96 |

*1: Stretching impossible due to filament cutting

TABLE 2

| | | Example 3 Million 240M | | | | | | Comparative Example 4 Conventional polyethylene | | | | |
|---|---|---|---|---|---|---|---|---|---|---|---|---|
| Properties | Unit | 6 times 1 stage | 8 times 1 stage | 10 times 1 stage | 10 times 2 stage | 18 times 2 stage | 30 times 2 stage | 6 times 1 stage | 8 times 1 stage | 10 times 1 stage | 12 times 2 stage | more than 18 times 2 stage |
| Inherent viscosity [η] | dl/g | 14.8 | 14.8 | 14.8 | 14.8 | 14.8 | 14.8 | 2.3 | 2.3 | Filament cutting* | 2.3 | Filament cutting* |
| Density | g/cm³ | 0.942 | 0.945 | 0.950 | 0.953 | 0.962 | 0.968 | 0.959 | 0.963 | Filament cutting* | 0.965 | Filament cutting* |
| Diameter of product | mmØ | 1.7 | 1.5 | 1.3 | 1.2 | 1.0 | 0.8 | 1.6 | 1.4 | Filament cutting* | 1.2 | Filament cutting* |
| Tensile strength at break | kg/mm² | 35 | 42 | 70 | 58 | 97 | 103 | 16 | 22 | Filament cutting* | 24 | Filament cutting* |
| Young's modulus | kg/mm² | 310 | 390 | 660 | 600 | 950 | 980 | 210 | 280 | Filament cutting* | 320 | Filament cutting* |
| Elongation | % | 30 | 15 | 10 | 10 | 5 | 5 | 20 | 5 | Filament cutting* | 5 | Filament cutting* |
| Folding return | degrees | 110 | 15 | 3 | 5 | 3 | 3 | 85 | 60 | Filament cutting* | 25 | Filament cutting* |

TABLE 2-continued

| Properties | Unit | Example 3 Million 240M 6 times 1 stage | 8 times 1 stage | 10 times 1 stage | 10 times 2 stage | 18 times 2 stage | 30 times 2 stage | Comparative Example 4 Conventional polyethylene 6 times 1 stage | 8 times 1 stage | 10 times 1 stage | 12 times 2 stage | more than 18 times 2 stage |
|---|---|---|---|---|---|---|---|---|---|---|---|---|
| angle at 180° | | | | | | | | | | | | |
| Folding return angle at 90° | degrees | 80 | 15 | 5 | 5 | 3 | 3 | 70 | 50 | Filament cutting* | 20 | Filament cutting* |

*Stretching impossible

EXAMPLE 3 AND COMPARATIVE EXAMPLE 4

The stretchable strands produced in Example 1 were stretched in a stretching bath containing triethylene glycol under the following draw ratios:

1) 6 times (i.e., first-stage stretching at 133° C.)
2) 8 times (i.e., first-stage stretching at 133° C.)
3) 10 times (i.e., first-stage stretching at 133° C.)
4) 12 times (i.e., first stage: 6 times at 133° C., second stage: 2 times at 144° C.)
5) 18 times (i.e., first stage: 6 times at 133° C., second stage: 3 times at 144° C.)
6) 24 times (i.e., first stage: 6 times at 133° C., second stage: 3 times at 144° C.)

In Comparative Example 4, conventional polyethylene having an intrinsic viscosity [η] of 2.6 dl/g, an MFR of 0.11 g/10 min, a melting point of 131° C., and a bulk density of 0.956 g/cm$^3$ was used to produce stretched filaments in the same conditions as in Example 3, except that the extruder temperature was changed to 220° C.

The resultant stretched filaments were evaluated as follows:

Density: ASTM D 1505 (no annealing)
Diameter dimension: Same as in Example 1
Tensile test: Same as in Example 1
Folding return angle:

(1) Return angle after 10 minutes from a fold of 180° (see FIG. 2)
(2) Return angle after 10 minutes from a fold of 90° (see FIG. 3)

The results are as shown in Table 2.

As is clear from the results shown in Table 2, when the stretching ratio (or draw ratio) is 8 or more, more specifically, 10 or more, the desired plastic wires having a small return angle when folded and having an excellent tensile strength at break can be obtained. Contrary to this, when conventional polyethylene is used, the desired plastic wires having a small return angle when folded cannot be obtained.

We claim:

1. A method for producing an extruded stretched filament of ultra-high-molecular-weight polyethylene having an intrinsic viscosity [η] of at least 4 dl/g and a tensile strength at break of at least 35 kg/mm$^2$ consisting of the steps of:
melting ultra-high-molecular-weight polyethylene having an intrinsic viscosity [η] of at least 4 dl/g in a screw extruder;
extruding the molten ultra-high-molecular-weight polyethylene from a die having an L/D of at least 10 to form an extruded strand; and
taking-off the extruded strand at a draft ratio of at least 1 while gradually cooling the extruded strand; and stretching the strand at a draw ratio of at least 6 to form an extruded stretched filament.

2. A method of producing a whitened wire of ultra-high-molecular-weight polyethylene having an intrinsic viscosity [η] of at least 6 dl/g, a tensile strength at break of at least 35 kg/mm$^2$, and a folding return angle $\theta$ of 10° or less when folded at 90° and 180°, consisting of the steps of:
melting ultra-high-molecular-weight polyethylene having an intrinsic viscosity [η] of at least 4 dl/g in a screw extruder;
extruding the molten ultra-high-molecular-weight polyethylene from a die having an L/D of at least 10 to form an extruded strand;
taking-off the extruded strand at a draft ratio of at least 1 while cooling the extruded strand; and
stretching the strand at a draw ratio of 8 to 30 to form a whitened wire.

3. A method as claimed in claim 2, wherein the strand is stretched at a draw ratio of 4 to 8 at a first stage and is stretched at a draw ratio of 2 to 5 at a second stage to form the wire at a total draw ratio of 8 to 30.

* * * * *